J. DESMOND.
STARTER VALVE.
APPLICATION FILED AUG. 2, 1915.

1,279,087.

Patented Sept. 17, 1918.

Witness
E. R. Barrett

Inventor
John Desmond
By Pagelsen & Spencer
Attorneys

UNITED STATES PATENT OFFICE.

JOHN DESMOND, OF DETROIT, MICHIGAN, ASSIGNOR TO GRAY-HAWLEY MANUFACTURING COMPANY, OF DETROIT, MICHIGAN, A CORPORATION OF MICHIGAN.

STARTER-VALVE.

1,279,087.   Specification of Letters Patent.   Patented Sept. 17, 1918.

Application filed August 2, 1915. Serial No. 43,292.

*To all whom it may concern:*

Be it known that I, JOHN DESMOND, a citizen of the United States, residing at Detroit, in the county of Wayne and State of Michigan, have invented a new and useful Starter-Valve, of which the following is a specification.

This invention relates to a starter construction for motor vehicles, more particularly to the valve means whereby compressed air used in the actuation of the starter and for other purposes is controlled and distributed. Some of its objects are to provide means for relieving the wear ordinarily occurring on the soft parts of the valve when high pressures are used; to provide means whereby a hose or other connection may be readily attached for inflating tires; to provide means whereby the pressure from which this inflation is obtained is reduced to safe working limits; to provide means for readily exhausting the compressed air which accumulates in the various passages leading to the starter; to provide for the attachment of a pressure gage; and to improve the starter construction generally.

Figure 1:
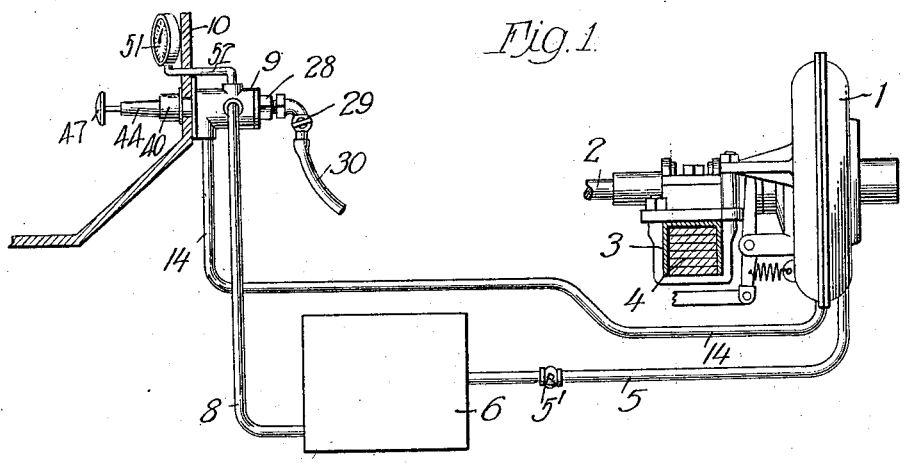
Figure 2:
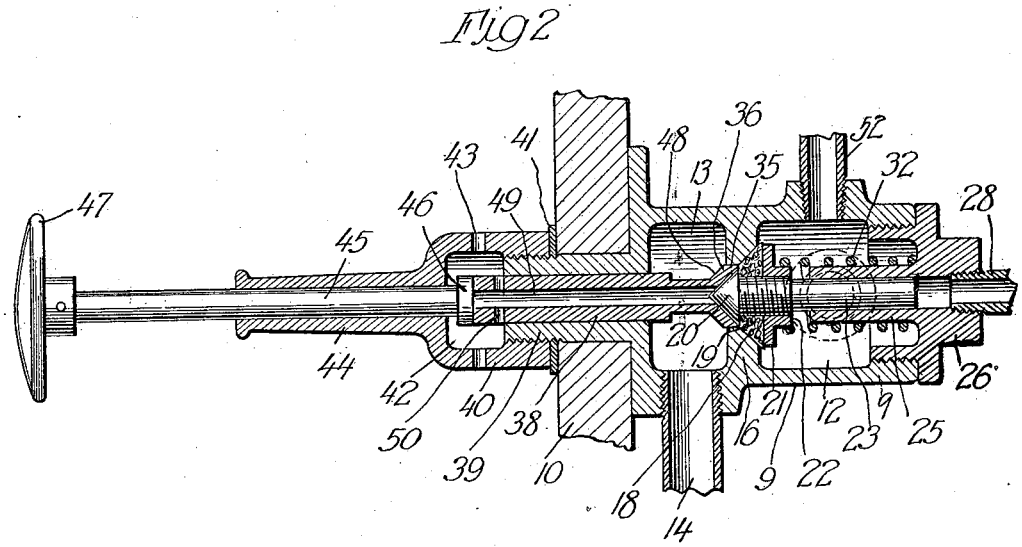

In the drawings, Figure 1 is a vertical section through a portion of a motor vehicle showing the valve installation. Fig. 2 is a central vertical section through the valve.

Similar reference characters refer to like parts.

In the embodiment of my invention shown, 1 indicates an air-driven starter for an internal combustion engine, the shaft of the latter being indicated at 2 and being mounted on the front cross bar 3, which may inclose the front spring 4 of a well known type of motor vehicle. The starter contains an air pump (not shown) from which air is delivered, through the pipe 5 and check-valve 5', to the storage tank 6 located at any convenient point, and a pipe 8, which enters a valve casing 9, mounted on the dash 10 or other desired portion of the vehicle, communicates the tank pressure to the distributing chamber 12 formed in the casing. Also formed in the casing is a discharge chamber 13 from which air is supplied to the starter to cause a forward impulse thereof by means of the pipe 14.

Extending transversely across the casing is a wall 16 in which is located a seat 18 for the soft body 19 (preferably frusto-conical) of a valve, the point 20 of which, together with a clamping nut 21, serve to retain the portion 19 in position. The body of the valve may be of rubber or similar material. The stem, threaded at 22, is reduced at 23 and loosely received in a guide 25 formed integral with a plug 26 for the end of the distributing chamber; and from the latter a pipe 28 leads to a valve 29 to which a hose 30 for inflating tires may be attached. The fit of the stem in the guide, while loose, is not sufficiently so to allow air to pass undesirably fast, consequently a heavier pressure than that allowed in the tires may be used for starting purposes. It will be seen, therefore, that the stem and guide constitute a pressure reducing means. A spring 32 normally forces the soft portion 19 into sealing engagement with the seat.

The valve seat 18 merges into a preferably cylindrical guide 35 in which is somewhat loosely received the head 36 of a plunger 38 that extends through the chamber 13 and has its rear end supported in the guide 39. It will be seen that this guide passes through the dash 10 and is threaded to receive a cap 40 (a washer 41 being interposed, if desired) within which is formed an exhaust chamber 42 in communication with the atmosphere through the passages 43; and the cap is also provided with a hollow neck 44 in which an operating rod 45, having a head 46 in alinement with the plunger, is reciprocable. At its outer or rear end, the valve may be supplied with the hand or foot contact 47. The end 36 of the plunger is preferably cup-shaped to receive and exert pressure on the valve point 20, and has its rear face 48 of conical form to correspond to the seat 18; it is also provided with the longitudinal passage 49 which communicates, through the lateral passages 50, with the exhaust chamber 42.

Operation: Assuming the parts are in the position shown, the soft portion of the valve is pressed against the seat by the spring 32 and air is prevented from escaping through the chamber 13 and pipe 14. Pressure now being applied to the operating rod 45, the plunger is thrust to the right to force the valve from its seat, and, during the earlier part of the movement, the head 36 prevents the escape of any appreciable amount of air past the valve seat. This, in turn, avoids the usual abrasion of the soft parts by the particles of dust and the like which are carried in the thin blast. However, as soon as the valve is removed a safe distance from its seat, the face 48 of the plunger clears the seat 18, and the current of air is then admitted into the chamber 13. At the end of the forward stroke of the starter, pressure is removed from the operating rod and the spring 32 re-seats the valve, after which the air in the chamber 13 and pipe 14 gradually escapes through the hollow plunger, any such action having previously been prevented by the sealing of the passages 50 within the guide 39. The pressure in the chamber 13 is thus relieved whether the head 36 is entirely out of the guide 35 or not. As a matter of fact, the vibration of the vehicle tends to gradually retract the head from the guide. The momentum acquired by the plunger in its movement with the valve head also tends to cause the head 36 to clear the guide 35 and thus allow the free escape of the pressure fluid from the chamber 13, as does the resultant pressure on the plunger of the air in the chamber 13 and in the space between the head 36 and the valve.

As stated, compressed air for the tires may be obtained at a safe working pressure by means of the hose 30, valve 29 and pressure-reducing device 23—25; and the gage 51, located in sight of the driver and connected to the chamber 12 by the pipe 52, serves an obvious purpose.

The details of construction may be changed considerably without departing from the spirit of my invention. I do not, therefore, wish to be limited otherwise than as indicated by the subjoined claims.

I claim—

1. In combination, a valve casing having a pressure chamber and a discharge chamber formed therein, said chambers being separated by a perforated wall shaped to form a valve seat, a valve for the seat, said valve being located in the pressure chamber and comprising a soft portion arranged to engage with the seat, resilient means for forcing the valve against the seat, a plunger having a head located in the discharge chamber and arranged to be slid bodily longitudinally of its own axis into engagement with the valve whereby the latter may be removed from contact with the seat, said plunger being hollow and having a head that serves to close the perforation in the wall until after the soft portion of the valve has been removed from the seat a predetermined distance, and, upon further movement, allowing the passage of air from one chamber to the other, whereby cutting of the soft part of the valve due to thin currents of air is avoided, the plunger being arranged to extend through the wall of the discharge chamber, the passage through the plunger being closed by the valve when the plunger is in engagement therewith, said passage being open when the plunger is disengaged from the valve, whereby compressed air may then be exhausted from the discharge chamber.

2. In combination, a valve casing having a distributing chamber and a discharge chamber formed therein, said chambers being separated by a perforated wall shaped to form a valve seat, the opposite wall of the distributing chamber having an opening therethrough, a conduit leading from the opening, means for closing the conduit, a valve for the seat, said valve being located in the distributing chamber and comprising a soft portion arranged to engage with the seat and a stem extending into the opening in the wall opposite the valve seat whereby means is provided between the stem and the wall of said opening for admitting air to the conduit at a pressure considerably below that in the distributing chamber, a plunger having a head located in the discharge chamber and arranged to be moved into engagement with the valve whereby the latter may be removed from contact with the seat, said plunger serving to close the perforation in the wall until after the soft portion of the valve has been removed from the seat a predetermined distance, and, upon further movement, allowing the passage of air from one chamber to the other, the whole arrangement being such that the cutting of the soft part of the valve due to thin currents of air is avoided.

3. In combination, a valve casing having a distributing chamber and a discharge chamber formed therein, said chambers being separated by a perforated wall shaped to form a valve seat, the opposite wall of the distributing chamber having an opening therethrough, a conduit leading from the opening, means for closing the conduit, a valve for the seat, said valve having a stem extending into said opening whereby means is provided between the stem and the wall of said opening for admitting fluid to the conduit at a pressure considerably below that in the distributing chamber.

4. In combination, a valve casing having a distributing chamber and a discharge chamber formed therein, said chambers being separated by a perforated wall shaped to form a valve seat, a plurality of conduits leading from the distributing chamber, means for closing one of the conduits, a valve for the seat, and means associated with said valve for admitting fluid to the last named conduit at a pressure considerably below that in the distributing chamber.

In testimony whereof I have signed this specification.

JOHN DESMOND.

Copies of this patent may be obtained for five cents each, by addressing the "Commissioner of Patents, Washington, D. C."